No. 872,405. PATENTED DEC. 3, 1907.
C. BURWELL.
THRESHING MACHINE.
APPLICATION FILED JULY 9, 1907.
2 SHEETS—SHEET 1.
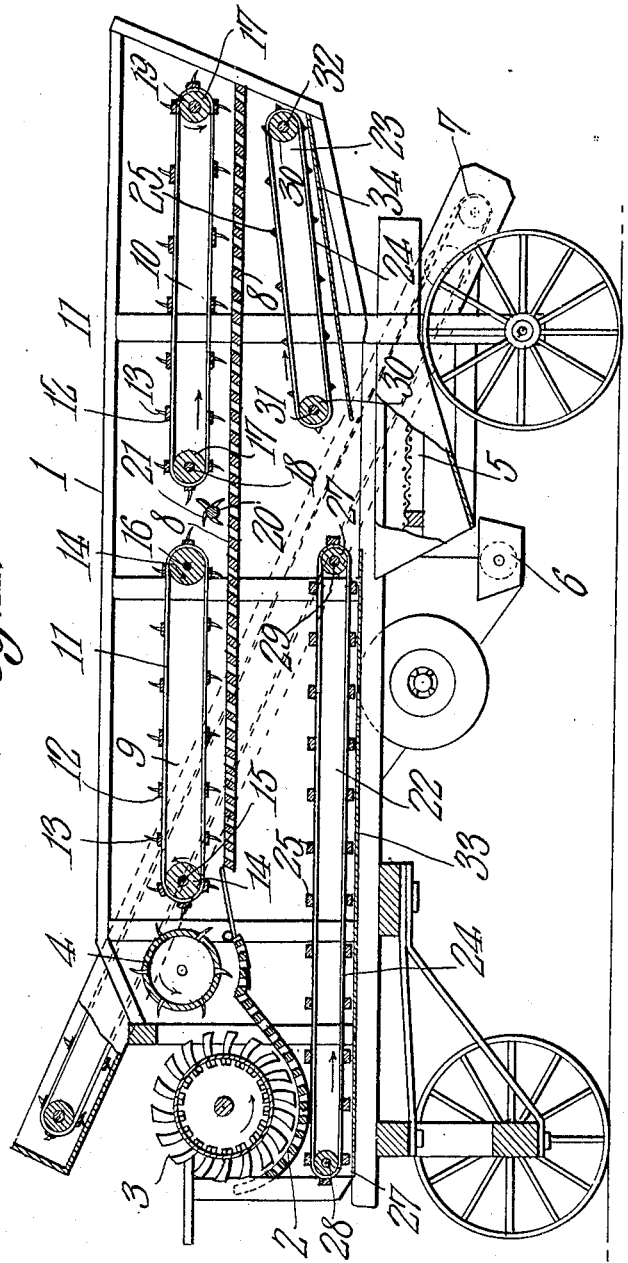
WITNESSES:
Cyrus Burwell, INVENTOR.
By C. A. Snow & Co.
ATTORNEYS No. 872,405. PATENTED DEC. 3, 1907.
C. BURWELL.
THRESHING MACHINE.
APPLICATION FILED JULY 9, 1907.
2 SHEETS—SHEET 2.
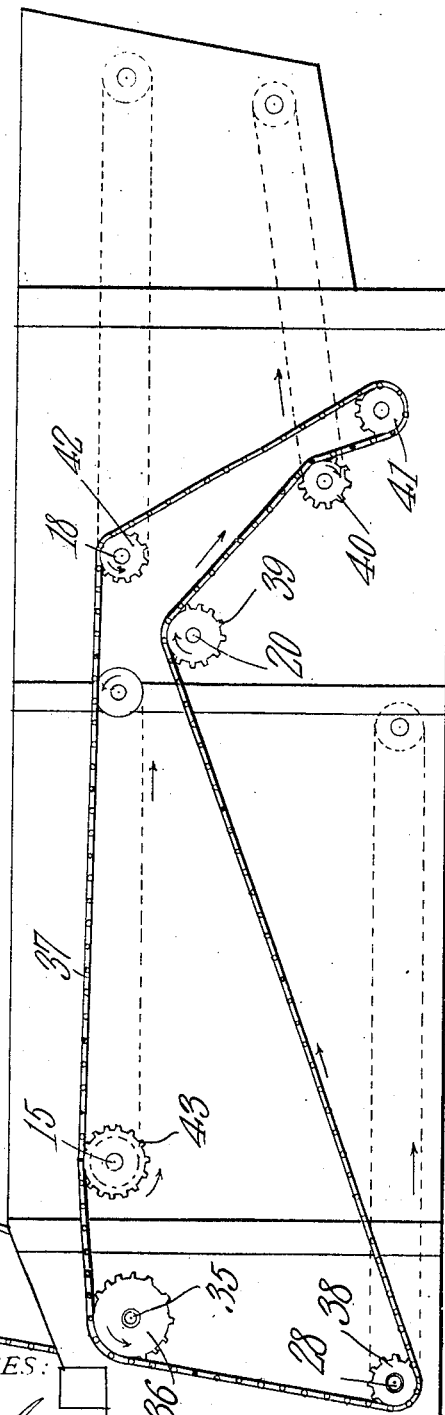
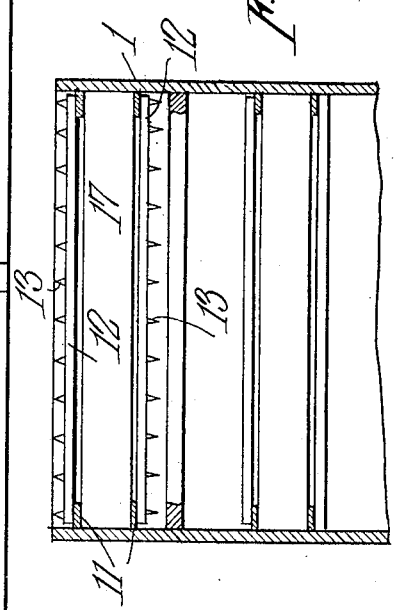
Cyrus Burwell,
INVENTOR.
WITNESSES:
By C. A. Snow & Co.
ATTORNEYS

UNITED STATES PATENT OFFICE.

CYRUS BURWELL, OF BUNKER HILL, ILLINOIS.

THRESHING-MACHINE.

No. 872,405.  Specification of Letters Patent.  Patented Dec. 3, 1907.

Application filed July 9, 1907. Serial No. 382,837.

*To all whom it may concern:*

Be it known that I, CYRUS BURWELL, a citizen of the United States, residing at Bunker Hill, in the county of Macoupin and State of Illinois, have invented a new and useful Threshing-Machine, of which the following is a specification.

This invention relates to machines for threshing grain and its object is to provide simple and efficient means whereby straw, after leaving the cylinder and concave of the threshing mechanism, can be quickly and thoroughly torn apart so that all of the grain will be separated therefrom and directed to the point of discharge.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a longitudinal section through a threshing machine embodying the present improvements. Fig. 2 is a side elevation of a portion thereof and showing one form of mechanism which may be employed for transmitting motion to the various parts of the mechanism. Fig. 3 is a vertical transverse section through the grate and the adjoining conveyers.

Referring to the figures by characters of reference, 1 designates the casing of the machine, the same being provided with a concave 2 and threshing cylinder 3 which may be of the usual or any preferred construction. A beater 4 is located adjacent the concave and a shaking screen 5, worm conveyer 6, and elevator 7 are also used in connection with the machine, although they constitute no part of the present invention. Extending transversely within the casing 1 and longitudinally therein is a grate 8 fixedly mounted, and arranged above this grate are two or more conveyers 9 and 10, each of which is made up of a pair of chains or belts 11 connected to transverse slats 12 from which teeth or prongs 13 extend. The conveyer 9 is mounted on rollers or sprockets 14 and 15 secured to shafts 15 and 16 and the conveyer 11 is mounted on rollers or sprockets 17 mounted on shafts 18 and 19. The lower plies of these conveyers are disposed close to the surface of the grate 8 and the adjoining portions of the two conveyers 9 and 10 are spaced apart so as to permit a shaft 20 to rotate therebetween. This shaft carries a plurality of fingers 21 for the purpose hereinafter set forth. Disposed below the grate 8 are two additional conveyers 22 and 23 each of which is preferably made up of a pair of belts or chains 24 connected by cross slats 25 designed for use as hereinafter set forth. The belts or chains of the conveyer 22 are mounted upon rollers or sprockets 27 carried by shafts 28 and 29 respectively and the belts or chains of the conveyer 23 are carried by rollers or sprockets 30 upon shafts 31 and 32 respectively. Disposed under the conveyer 22 is an imperforate guide board 33 which may, if desired, be formed of sheet metal and another board 34 is disposed under the conveyer 23. The two boards 33 and 34 are designed to direct material on to the receiving end of the screen 5.

Shaft 35 of the beater 4 has a sprocket 36 designed to transmit motion through a chain or belt 37 to a sprocket 38 on shaft 28 and said chain then extends over a sprocket 39 on shaft 20 and downward over a sprocket 40 on shaft 31 and under an idler 41. The chain then extends upward over a sprocket 42 on shaft 18 thence over a sprocket 43 on shaft 15. It will be noted that the sprocket 36 is slightly larger than the sprocket 43 and said sprocket 43 is likewise larger than the sprocket 39. Sprocket 42 is smaller than either of the three sprockets mentioned. Obviously therefore the shafts 35, 15, 20 and 18 will rotate at different speeds.

In using the apparatus the material to be threshed is supplied to the machine in the usual manner and after leaving the concave it is directed by the beater 4 between the conveyer 9 and the grate 8. As the shaft 15 rotates more rapidly than the beater 4 it will be apparent that the straw or other material will be torn away from the beater and spread over the grate thereby facilitating the separation of the grain from the straw. When material reaches the shaft 20 the fingers 21 thereon will engage the straw and tear it away from the conveyer 19 because the shaft 20 rotates at a greater speed than do the shafts of said conveyer. Conveyer 10, in turn, tears the material from the fingers 21 because its shafts rotate more rapidly than does the shaft 20. The straw will therefore be thoroughly spread throughout the length of the grate 8 and the separation of the grain therefrom will be insured as a result of these successive tearing operations. The grain falling through the grate will drop between the slats of conveyers 22 and 23 and onto the boards 33 and 34. The slats of these conveyers operate to slide the grain along the boards and onto the screen 5. It is to be understood that the number of tearing devices shown at 9, 10 and 21 can be multiplied indefinitely but it has only been necessary to show the two conveyers and the arms 21 to illustrate the present invention. The directions of movement of the various parts of the apparatus have been clearly indicated by arrows in the drawings.

What is claimed is:

1. In a threshing machine the combination with a fixed grate; of endless conveyers supported thereabove and moving at different speeds, revoluble devices adjacent opposite portions of one of the conveyers, one of said devices being disposed to rotate at a greater speed than said conveyer and the other device being disposed to rotate at a speed between those of the two conveyers.

2. In a threshing machine the combination with a cylinder and a concave; of a fixed grate adjacent and extending beyond the concave, and separate means disposed to successively engage material and direct it from the concave and along the grate, each of said means being movable at a less speed than the succeeding means.

3. In a threshing machine the combination with a cylinder and a concave; of a fixed grate adjacent, and extending beyond, the concave, separate means disposed to successively engage material and direct it from the concave and along the grate, each of said means being movable at less speed than the succeeding means, a screen, guide boards disposed below the grate for directing material toward the screen, and endless means above each board for dragging material thereon toward the screen.

In testimony that I claim the foregoing as my own, I have hereto affixed my signature in the presence of two witnesses.

CYRUS BURWELL.

Witnesses:
W. P. HIGGINS,
JOHN S. KLINFELTER.